March 21, 1961     A. J. DOWLING     2,976,522
SEVERE STORM AND TORNADO WARNER
Filed Aug. 7, 1959
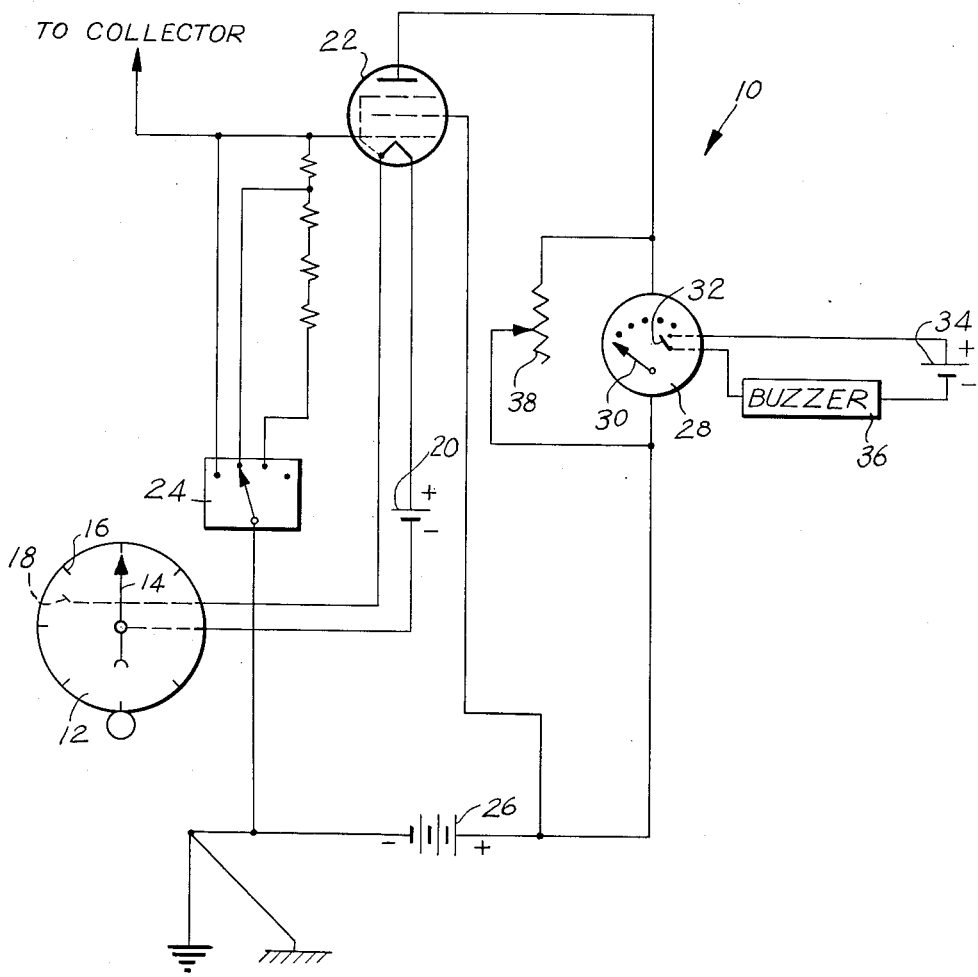
INVENTOR.
ARTHUR J. DOWLING
BY
H. Laurence Blasius
Agent

United States Patent Office 2,976,522
Patented Mar. 21, 1961

2,976,522

SEVERE STORM AND TORNADO WARNER

Arthur J. Dowling, Oberlin, Kans.

Filed Aug. 7, 1959, Ser. No. 832,372

3 Claims. (Cl. 340—220)

This invention relates to weather instruments and more particularly to a device for detecting storms.

It is an object of the present invention to provide an instrument for detecting severe storms and tornadoes before they actually strike so as to allow sufficient time for taking necessary precautions.

Another object of the present invention is to provide a storm warning instrument of the above type having a self contained supply of electrical energy which is only utilized when certain weather conditions exist, so as to prevent unnecessary use of such source to thus prolong the useful life of the instrument without maintenance operations.

Other objects of the invention are to provide a storm warning instrument bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

The figure is a schematic diagram of the various components and circuitry of a storm warning instrument made in accordance with the present invention.

Referring now more in detail to the drawing, a storm warning instrument 10 made in accordance with the present invention is shown to include an air pressure measuring means in the form of a barometer 12 having an indicating pointer 14 which is rotatable with respect to a scale 16. The pointer 14, when actuated a sufficient distance will close an electrical circuit through a stationary contact 18, so as to energize an electronic tube 22 by means of a small filament battery 20. This will complete a circuit through a range switch 24, a plate battery 26, and a collector, to actuate the indicator 30 of a milliammeter 28. In the event that the static electricity detected by the collector and the remaining circuitry exceeds a minimum amount, the movement of the pointer 30 will close a second switch 32 associated with the milliammeter 28, to actuate an audible signal 36 that is connected in series with a motivating source of electricity 34.

It will now be recognized that the entire circuit remains substantially deenergized until the barometer 12 first detects a sufficiently low enough air pressure to enable the pointer 14 to close the circuit through the stationary contact 18. When this takes place, the detection of a minimum amount of static electricity by the electrometer defined by the electronic tube 22, collector, and source 26, will cause the milliammeter pointer 30 to close the second switch 32 to actuate the signal device 36.

Since most severe storms have both low pressure and high static electricity, it is thus unnecessary for the circuit to be energized unless both of these conditions are fulfilled as determined by the barometer and the electrometer. Thus, the sources of electrical energy are not drawn upon until actually needed, thus extending the useful life thereof for substantially long periods of time without maintenance operations.

While various changes may be made in the detail construction, it shall be understood that such changes shall be within the spirit and scope of the present invention as defined by the appended claims.

What I claim as new and desire to protect by Letters Patent of the United States is:

1. A storm warning instrument comprising, in combination, air pressure measuring means, means for measuring the intensity of static electricity, a signal device, first switch means for energizing said static electricity measuring means in response to a predetermined drop in air pressure, second switch means energizing said signal device in response to a predetermined increase in static electricity as determined by said energized static electricity measuring means, said air pressure measuring means comprising a barometer, said static electricity measuring means comprising an electrometer including a collector, an electronic tube, and a source of electrical energy, said storm warning instrument being responsive to the presence of static electricity to provide a visual and audible signal.

2. The combination according to claim 1, wherein said first switch means comprises a stationary contact carried by said barometer in the path of movement of an indicating pointer thereof.

3. The combination according to claim 2, wherein said second switch means comprises a milliammeter having a pivotally mounted indicating pointer, and a pressure sensitive switch in circuit with said signal device in the path of movement of said indicating pointer for closing the electrical circuit through said signal device in response to pivotal movement of said indicating pointer beyond a predetermined extent.

References Cited in the file of this patent

UNITED STATES PATENTS

| | | |
|---|---|---|
| 1,919,215 | Gunn | July 25, 1933 |
| 2,461,075 | Naylor | Feb. 8, 1949 |
| 2,475,356 | Meschter | July 5, 1949 |
| 2,801,408 | Drasky | July 30, 1957 |
| 2,820,217 | Sperry | Jan. 14, 1958 |